(12) United States Patent
Zhang (10) Patent No.: US 12,105,483 B2
(45) Date of Patent: Oct. 1, 2024

(54) INTELLIGENT DEVICE AND METHOD FOR CONTROLLING THE SAME

(71) Applicant: SAMSUNG ELECTRONICS CO., LTD., Suwon-si (KR)

(72) Inventor: Jianhua Zhang, Guangdong (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/103,112

(22) Filed: Nov. 24, 2020

(65) Prior Publication Data

US 2022/0019178 A1 Jan. 20, 2022

(30) Foreign Application Priority Data

Jul. 15, 2020 (CN) .......................... 202010680017.1

(51) Int. Cl.
*G05B 13/02* (2006.01)
*G06F 3/16* (2006.01)
(Continued)

(52) U.S. Cl.
CPC ......... *G05B 13/027* (2013.01); *G05B 13/024* (2013.01); *G06F 3/16* (2013.01); *G06N 3/08* (2013.01); *G10L 15/16* (2013.01)

(58) Field of Classification Search
CPC ............... G05B 13/027; G05B 13/024; G05B 2219/2642; G05B 15/02; G06F 3/16; G06F 3/167; G06N 3/08; G06N 3/04; G06N 5/046; G10L 15/16; G10L 15/22; G10L 15/1822; G10L 2015/223; H04L 12/282

See application file for complete search history.

(56) References Cited

U.S. PATENT DOCUMENTS 10,885,091 B1 * 1/2021 Meng ................ G06F 16/24578
11,282,020 B2 * 3/2022 Panuganty ............. G06F 40/30
(Continued)

FOREIGN PATENT DOCUMENTS

| CN | 105516810 A | 4/2016 |
|---|---|---|
| CN | 109036421 A | 12/2018 |

(Continued)

OTHER PUBLICATIONS

Chinese Office Action dated Oct. 30, 2023 for CN Application No. 202010680017.1.

(Continued)

*Primary Examiner* — Thomas C Lee
*Assistant Examiner* — Tyler Dean Hedrick
(74) *Attorney, Agent, or Firm* — Nixon & Vanderhye P.C.

(57) ABSTRACT

The disclosure provides a method for controlling an intelligent device and an intelligent device. The method comprises: receiving a voice input; determining a service instruction based on the received voice input; determining a target serviced object for which the service instruction is intended; determining a target execution element of the service instruction based on the target serviced object; and controlling the intelligent device to perform an action corresponding to the service instruction based on the target execution element. In addition, the process of determining the target serviced object for which the service instruction is intended may be performed based on an artificial intelligence model.

8 Claims, 3 Drawing Sheets

(51) Int. Cl.
*G06N 3/08* (2023.01)
*G10L 15/16* (2006.01)

(56) References Cited

U.S. PATENT DOCUMENTS

| | | | |
|---|---|---|---|
| 11,430,434 B1* | 8/2022 | Milstein | G10L 15/08 |
| 2009/0164215 A1* | 6/2009 | Lu | G10L 15/26 |
| | | | 704/E21.001 |
| 2015/0212791 A1* | 7/2015 | Kumar | G10L 15/22 |
| | | | 715/728 |
| 2018/0088894 A1* | 3/2018 | VanBlon | G06F 3/0482 |
| 2018/0260680 A1 | 9/2018 | Finkelstein et al. | |
| 2018/0322872 A1 | 11/2018 | Cha et al. | |
| 2019/0378518 A1 | 12/2019 | Jeong et al. | |
| 2020/0043478 A1 | 2/2020 | Lee | |

FOREIGN PATENT DOCUMENTS

| | | |
|---|---|---|
| CN | 109640142 A | 4/2019 |
| CN | 109726332 | 5/2019 |
| CN | 110415694 | 11/2019 |
| CN | 110888328 A | 3/2020 |
| KR | 10-2018-0063391 A | 6/2018 |

OTHER PUBLICATIONS

Chinese Office Action dated May 20, 2024 for CN Application No. 202010680017.1.

\* cited by examiner

INTELLIGENT DEVICE AND METHOD FOR CONTROLLING THE SAME

CROSS-REFERENCE TO RELATED APPLICATION

This application is based on and claims priority under 35 U.S.C. § 119 to Chinese Patent Application No. 202010680017.1, filed on Jul. 15, 2020, in the China National Intellectual Property Administration, the disclosure of which is incorporated by reference herein in its entirety.

BACKGROUND

1. Field

The present disclosure relates to the field of intelligent devices, and for example, to an intelligent device and a method for controlling the same.

2. Description of Related Art

Currently, various electronic products are widely used in a user's home. Such electronic products can be controlled and manipulated through an intelligent device based on the Internet of Things (IoT) technology, thereby facilitating the user's life. The user may control all electronic products through the intelligent device just by issuing an instruction to the intelligent device in the home. However, when the user controls the operations of the electronic product, there would be such a scenario in which the user, who issued the instructions for controlling, would control the intelligent device to provide a service to another user.

The existing intelligent devices do not take into account whether the used resource is intended for the user who issued the instruction (e.g., the instructions issuer) or another user for whom the instruction issuer requests a program (for example, a parent may control the electronic product to play back a program randomly for a child who can't speak yet). It may not meet the user's actual preference if different serviced objects are not distinguished or the instructions issuer is regarded as the object for whom the resource is intended, which may lead to a bad user experience.

For example, as intelligent speakers are becoming more and more popular, many families may use the intelligent speaker to listen to a program more and more conveniently. The user may obtain massive resources and control the intelligent device through the intelligent speaker, just by speaking at home. When the user issues a clear instruction to the intelligent speaker, the intelligent speaker may identify it and accurately play a corresponding resource. The intelligent speaker may identify a family member through the voiceprints of the member, and play a targeted resource for the identified family member. In our daily lives, the user usually controls the intelligent speaker with the instruction to provide the service for another family member due to various reasons. For example, a parent may control the electronic product to play back a program randomly for a child who can't speak yet. The intelligent speaker still needs to be improved in terms of identifying a random instruction and selecting a corresponding service for others without a clear indication of the name of a to-be-played resource. For example, Dad says "please play a song for Xiaohua" to the intelligent speaker. The intelligent speaker cannot identify that the object who will listen to the song is Xiaohua. On the contrary, the intelligent speaker may play the song without distinguishing the objects or play the song which Dad likes.

SUMMARY

Embodiments of the disclosure provide an intelligent device and a method for controlling the intelligent device, address the above-identified problems and other problems not mentioned herein.

An example embodiment of the present disclosure provides a method for controlling an intelligent device, the method comprising: receiving a voice input; determining a service instruction based on the voice input; determining a target serviced object for which the service instruction is intended; determining a target execution element of the service instruction based on the target serviced object; and controlling the intelligent device to perform an action corresponding to the service instruction based on the target execution element.

The determining the target serviced object may include: identifying the target serviced object from a voice.

The identifying may include: identifying the target serviced object from the voice input, or obtaining the target serviced object by analyzing a voice input in a previously predetermined period.

The method may further comprise: determining the target serviced object based on a tag vocabulary in the voice related to the target serviced object.

The target serviced object may be determined based on a service custom, in response to the target serviced object not being identified from the voice.

The service custom may be obtained based on a historical voice input and its corresponding historical service data.

The service custom may be obtained through a training with the historical voice input and the historical service data based on an artificial intelligence algorithm.

In response to the target serviced object not being identified from the voice, a serviced object is provided to the user for selection, and/or the user of the voice input is determined as the target serviced object.

If it is determined that the service instruction is an instruction type comprising a serviced object, the determining the target serviced object is performed.

The determining the target execution element may comprise: obtaining personalized configuration information of the target serviced object, and determining the target execution element for the target serviced object based on the personalized configuration information.

The target execution element may include at least one of an executing body, an execution parameter and a control parameter.

The personalized configuration information of the target serviced object may be established based on the historical service data of the target serviced object.

The method may further comprise: in response to a plurality of target serviced objects being determined, searching for a common preference of the plurality of target serviced objects, and determining the target execution element based on the common preference; or selecting one of the plurality of target serviced objects as a final target serviced object to determine the target execution element, based on a feedback.

If there are a plurality of intelligent devices, the target execution element may include an execution element for each of the plurality of intelligent devices.

Another example embodiment of the present disclosure provides an intelligent device. The intelligent device comprises: a receiving module comprising receiving circuitry configured to receive a voice input; a service instruction determining module comprising circuitry configured to determine a service instruction based on the voice input; a target serviced object determining module comprising circuitry configured to determine a target serviced object for which the service instruction is intended; a target execution element determining module comprising circuitry configured to determine a target execution element of the service instruction based on the target serviced object; and a controlling module comprising circuitry configured to control the intelligent device to perform an action corresponding to the service instruction based on the target execution element.

The target serviced object determining module may be configured to: identify the target serviced object from the voice input.

The target serviced object determining module may be further configured to: identify the target serviced object from the voice input, or obtain the target serviced object by analyzing a voice input in a previously predetermined period.

The target serviced object determining module may be further configured to: determine the target serviced object based on a tag vocabulary in the voice related to the target serviced object.

The target serviced object determining module may be configured to: determine the target serviced object based on a service custom in response to the target serviced object not being identified from the voice.

The service custom may be obtained based on a historical voice input and its corresponding historical service data.

The service custom may be obtained through a training with the historical voice input and the historical service data based on an artificial intelligence algorithm.

The target serviced object determining module may be configured to: provide a serviced object for selection, and/or determine the user of the voice input as the target serviced object in response to the target serviced object not being identified from the voice.

The target serviced object determining module may be configured to: if it is determined that the service instruction is an instruction type comprising a serviced object, perform determining the target serviced object.

The target execution element determining module may be configured to: obtain personalized configuration information of the target serviced object, and determine the target execution element for the target serviced object based on the personalized configuration information.

The target execution element comprises at least one of an executing body, an execution parameter and a control parameter.

The personalized configuration information of the target serviced object may be established based on the historical service data of the target serviced object.

The target execution element determining module may be configured to: in response to a plurality of target serviced objects being determined, search for a common preference of the plurality of target serviced objects, and determining the target execution element based on the common preference, or select one of the plurality of target serviced objects as a final target serviced object to determine the target execution element, based on a user's feedback.

If there are a plurality of intelligent devices, the target execution element may include an execution element for each of the plurality of intelligent devices.

According to an example embodiment, a non-transitory computer-readable storage medium storing instructions is provided, wherein the instructions, when executed by at least one computing apparatus, cause the at least one computing apparatus to perform the method for controlling the intelligent device as described above.

According to another example embodiment, an electronic device is provided, the electronic device comprising: a processor; and a memory, storing a computer program, wherein the computer program, when executed by the processor, causes the processor to perform the method for controlling the intelligent device as described above.

The device and method described above may determine a target serviced object for which a service instruction is intended by determining the service instruction based on a voice input, and may control an intelligent device to perform an action corresponding to the service instruction for the target serviced object, which not only provides a service for an actual target serviced object for which the service instruction is intended, but also improves user experience.

In addition, other aspects, advantages and distinguishing features of the disclosure will become apparent to those skilled in the art based on the following detailed description of example embodiments of the present disclosure disclosed in conjunction with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the present disclosure will be described in greater detail with reference to the accompanying drawings. It should be noted that in the accompanying drawings, the same elements are denoted by the same reference numerals. In the following description, the content such as detailed configurations and specific details of the components are provided to aid in understanding of the various example embodiments of the present disclosure. Therefore, it should be apparent to those skilled in the art that various changes and modifications may be made to the embodiments described herein without departing from the spirit and scope of the present disclosure. In addition, for clarity and conciseness, descriptions of well-known functions and structures may be omitted.

The terms used herein are used to describe various embodiments of the present disclosure, but not limit the present disclosure. Unless the context clearly indicates otherwise, the singular form is intended to comprise the plural form. In the present disclosure, it should be understood that the term "comprising" or "having" indicates the existence of features, numbers, steps, operations, elements, components, or combinations thereof, and does not exclude the existence of one or more other features, numbers, steps, operations, elements, components, or combinations thereof, or the possibility of adding one or more other features, numbers, steps, operations, elements, components, or combinations thereof.

Unless clearly defined otherwise, all terms used herein have the same meaning as understood by those skilled in the art to which the present disclosure belongs. Terms such as those defined in the general dictionaries shall be interpreted as having the same meaning as the contextual meaning in the related field, and unless clearly defined in the present disclosure, they should not be interpreted as having ideal or excessive formal meaning.

Figure 1:
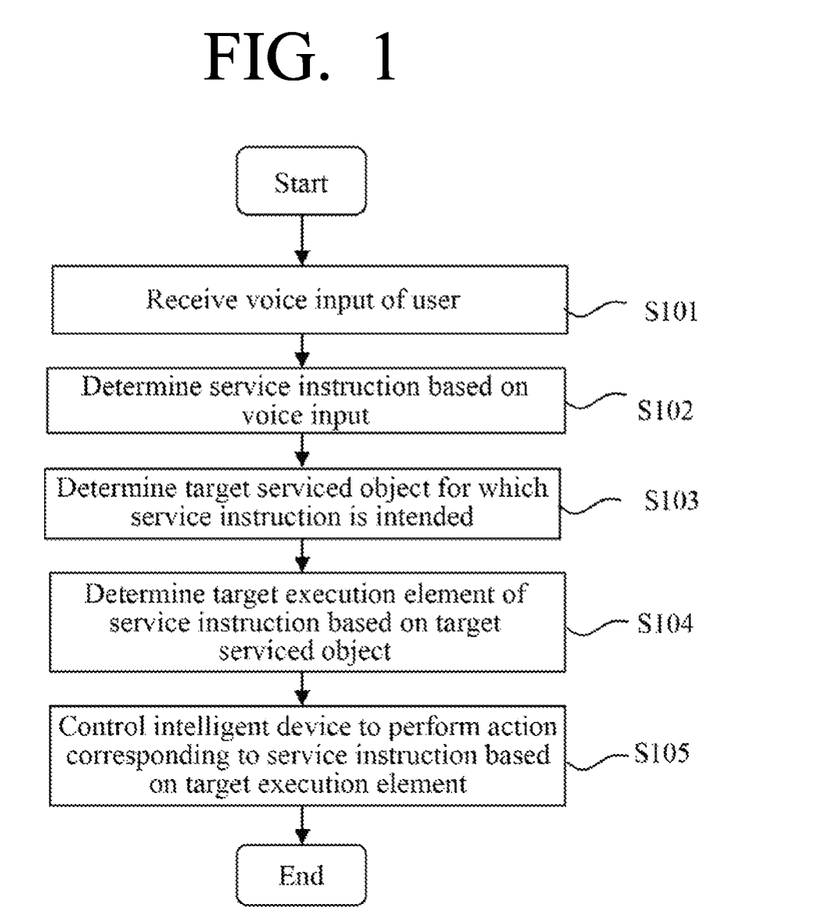
FIG. 1 is a flowchart illustrating an example method for controlling an intelligent device according to various embodiments.

FIG. 1 is a flowchart illustrating an example method for controlling an intelligent device according to various embodiments. The method may be implemented by a program in the intelligent device itself or may be implemented by a program in another electronic apparatus. For example, the electronic apparatus may be a mobile communication terminal (for example, a smart phone), a wearable device (for example, a smart watch), a portable multimedia apparatus, a portable medical apparatus, a tablet computer, etc., but the electronic apparatus is not limited to those electronic apparatuses described above.

Referring to FIG. 1, in operation S101, the method comprises receiving a voice input of a user. The intelligent device according to an embodiment may include a component (for example, a microphone) for receiving voice information to receive the voice input of the user.

In operation S102, the method comprises determining a service instruction based on the voice input. The service instruction refers to an instruction in the voice input of the user that the user sends to the intelligent device to control the electronic apparatus. The intelligent device controls an operation of another electronic apparatus based on the determined service instruction. The service instruction in the voice input may be determined based on the voice recognition technology, or the service instruction may be determined by converting the voice input into text information and identifying a keyword in the text information. However, the method for determining the service instruction in the voice input is not limited to the above methods, and any method that can identify the service instruction by analyzing the voice input may be used in the present disclosure.

According to an embodiment, the determined service instruction may be divided into a service instruction in which a serviced object needs to be considered and a service instruction in which a serviced object is not considered. The service instruction in which the serviced object needs to be considered may include, for example, a name of a resource the progress of which needs attention, a name of a resource type, etc., but is not limited hereto. For example, if a user instruction comprises service content in which the serviced object needs to be considered, a serviced object identification operation is performed. For example, the service instruction of the user is "play a story". Story is a program type, which is not specific play content. In this case the serviced object needs to be identified. As another example, the service instruction of the user is "play Langyabang". Langyabang is a TV series. There may be a plurality of different viewing progresses of the Langyabang. In this case it is necessary to identify the serviced object and play the Langyabang according to different situations. The service instruction in which a serviced object is not considered comprises an instruction unrelated to the serviced object, an instruction in which the progress of a service needs no attention, a very specific resource name, etc., but is not limited to hereto. For example, if a user instruction comprises service content in which the difference of serviced objects does not need to be considered, it is not necessary to determine the target serviced object. For example, the service instruction of the user is "turn on the air conditioner". The air conditioner is a shared resource. It is only necessary to, based on the current temperature of the user's area and the user's usual habit of turning on the air conditioner, determine cooling or heating and turn on the air conditioner to a suitable temperature which is fine to the user. As another example, the user instruction is "play Peppa Pig". Based on the instruction, a keyword "Peppa Pig" is extracted. Since the children's animation is of non-continuous plot content, the animation is directly played in a recorded progress. As another example, the user instruction is "play Bewa children's songs". "Bewa children's songs" is the name of a specific resource collection, so the content in the Bewa children's songs is played directly. The method for dividing the service instruction of the present disclosure is not limited to the above method, and the service instruction comprised in the voice input may be divided based on other aspects.

In operation S103, the method comprises determining a target serviced object for which the service instruction is intended. The existing methods usually do not consider the serviced object or only determine the user who issues the instruction as the serviced object. In fact, there is such scenario in which the user issues the instruction for another user. For example, a parent issues a service instruction including "play a cartoon" for their children. The method for controlling the intelligent device of the present disclosure determines the target serviced object for which the service instruction is intended by considering the user who issues the service instruction, the content of the service instruction, context information of the service instruction, etc. The target serviced object may be a serviced object other than the instruction issuer (that is, the user of the voice input).

According to an embodiment, the target serviced object may be identified from a voice of the user, and further, the target serviced object may be identified from a current voice input. If the voice input of the user comprises the service instruction issued to the intelligent device, the voice input usually may comprise the target serviced object for which the service instruction is intended, and therefore, the target serviced object may be identified from the voice input. Specifically, the target serviced object may be identified from the voice input by using a natural voice processing technology. A voice-to-text technology may be used to convert the voice into text, and a word segmentation result and a part of speech of each word may be obtained using such as word segmentation technology/part of speech labeling/named entity recognition technology for natural language processing. The obtained nouns may be filtered to obtain a word that may be used as the target serviced object. If there is a specific serviced object in the instruction, the specific serviced object is considered as the actual serviced object, and then service data for the specific serviced object is selected. For example, the user instruction is "play a song for grandma". It may be detected that grandma is the designated target serviced object based on semantic analysis.

If there is an ambiguity between the name as the serviced object and the service content, semantic analysis is used to reduce the ambiguity. For example, Zhang San will play a children's song for his sister. Using the natural language processing technology, a word segmentation result and a part of speech of each word are obtained. It is determined that the actual target serviced object is "his sister" instead of "Zhang San". Therefore, the result of the semantic analysis is "play a children's song for his sister".

In addition, intention classification of semantic analysis may be used to classify an intention of a sentence. For example, the instruction is "play a Jay Chou's song" It is classified as "playing a star song". For example, the instruction is "play a song for Xiaohua". It is classified as "playing a song for a family member". Different categories indicate different intentions. Different categories should be treated differently. For example, if it is the above category of "playing a star song", it may be identified that "Jay Chou" is a singer based on a third-party search function (for example, Baidu search, etc.) and then his album is played.

According to an embodiment, the current voice input of the user does not necessarily comprise the target serviced object for which the service instruction is intended. For example, usually, the user has already informed the intelligent device of the serviced object, before sending the service instruction to the intelligent device. Therefore, the target serviced object may be obtained by analyzing a voice input in a previously predetermined period. For example, the intelligent device may analyze a voice input within a predetermined period before the current voice input to determine a serviced object, and determine the determined serviced object as the current target serviced object. For example, if a word of an instruction action is identified in dialogue, the intelligent device backtracks a certain number of previous dialogues to find out whether there is a corresponding serviced object and service content. The method for identifying the serviced object from the voice input in the previously predetermined period is the same as the method for identifying the target object from the current voice input, and repeated description is not provided herein.

The intelligent device may manually or automatically record some data, such as identity tags for distinguishing different members and their corresponding preference data. We may use these existing identity tags and preference data to specify the object that needs the service and acquire his preference data.

The method according to an example embodiment comprises: determining the target serviced object based on a tag vocabulary in the voice of the user related to the target serviced object. According to an embodiment of the present disclosure, the tag vocabulary of the serviced object may be a nickname or a social relationship vocabulary, etc. For example, the nickname may be, for example, baby, dear, user's nickname, etc., and the social relationship vocabulary may be, for example, assistant, boss, best friend, minister, etc. The tag vocabulary in the intelligent device may be user data information previously recorded by the intelligent device, and the user data information are identity tags for distinguishing different objects. For example, the nickname and the social relationship vocabularies are used as the tag vocabulary in the intelligent device. Each nickname or social relationship may correspond to an object one-to-one. For example, if the nickname of the target serviced object is identified as "Xiaohua", it may be determined that "Xiaohua" corresponds to the youngest child in the family based on the tag vocabulary in the intelligent device. Thus, the youngest child is determined as the target serviced object. The tag vocabulary in the intelligent device may be the identity tag of each user preset by the user. For example, dad's identity tag may be dad, husband, boss, etc. If the nickname related to the target serviced object identified from the voice input is "dad", "dad" is determined as the target serviced object.

In addition, if the target serviced object is not identified from the voice of the user, the target serviced object is determined based on a service custom. According to an embodiment, the service custom may be obtained based on a historical voice input and its corresponding historical service data. The historical service data comprises a service instruction, a serviced object, a service environment (comprising time environment and/or geographic environment, for example), etc. For example, the intelligent device may record historical instructions of the user in the same time period in many days, and establish data of a daily-same-period instruction custom and data of everyday-same-period behalf issuing instruction custom of an intelligent speaker. If the instruction may match these data, then the serviced object may be determined. If the instruction does not contain the specific serviced object, then the intelligent device selectively inquires to determine the serviced object based on a daily instruction custom. In addition, the user may add member's initialization information, such as preference, voice, health status, etc. For example, if the user is a child, her age group or birthday information may be set. Based on the member's usage habit, relevant information of the member is updated, and an updated result is stored in a database.

Determining the serviced object based on the service custom may comprise: based on the instruction issuer being inconsistent with the serviced object for the instruction daily in this time period, inquiring whether to determine the serviced object based on the service custom. For example, the intelligent device provides the service for Xiaohua more than 80% of the time from 8 pm to 9 pm in every day. If a service instruction for playing a song is received from mom, it is analyzed that Xiaohua is the usual serviced object in this period. In this regard, a question "do you want to play a song for Xiaohua?" may be inquired. After obtaining an affirmative answer, a Xiaohua's favorite song will be played. In addition, if a higher probability is reached (for example, 95% of the time period is serving Xiaohua) and it is her mom who gives the instruction on behalf of Xiaohua, then no inquiry is made, and Xiaohua's preference data is used directly to serve Xiaohua. If the previous instruction is related to playing a resource, the serviced object may be consistent with that in the previous instruction at the end of the previous program or within a certain period. For example, dad just finished Langyabang and the user instruction is "play the TV serial X". In this instruction, no specific serviced object is specified, but the current and actual serviced object may be set as dad since the usual serviced object dad has just finished Langyabang, and then the types of TV serial that dad might like are recommended. If a playback instruction only specifies a playback type without the serviced object or detailed content, then based on the playback type in combination with preference data, an approximate serviced object is inferred, and a resource that may meet the preference of the serviced object is played. For example, in the preference data, Xiaohua likes to listen to Qiaohu's children's songs. The received instruction is "play a children's song". It is inferred that the serviced object is Xiaohua based on all the preference tags of the user, since the one who likes to listen to children's songs is Xiaohua, and a children song will be played for Xiaohua.

According to an embodiment, the service custom may be obtained through a training with the historical voice input and the historical service data based on an artificial intelligence (AI) algorithm, such that the target serviced object of the service instruction in the current environment can be predicted. Here, "obtained through a training" may refer, for example, to training a basic artificial intelligence model with a plurality of training data through a training algorithm, thereby obtaining a predefined operating rule or artificial intelligence model, which is configured to perform the desired features (or purposes).

According to an embodiment, functions associated with the artificial intelligence model may be performed by a non-volatile memory, a volatile memory, and a processor. The processor may comprise one or more processors. In this regard, the one or more processors may be general-purpose processors (such as central processing unit (CPU), or application processor (AP)), processors used only for graphics (such as graphics processing unit (GPU), visual processing unit (VPU) and/or AI dedicated processors (such as neural processing unit (NPU)).

The one or more processors control the processing of input data based on the predefined operating rule or artificial intelligence model stored in the non-volatile memory and volatile memory. The predefined operating rule or artificial intelligence model may be provided through training or learning. Here, " . . . may be provided through learning" may refer, for example, to a predefined operating rule or AI model with desired characteristics being formed by applying a learning algorithm to a plurality of learning data. The learning may be performed in the device itself that performs AI according to the embodiment, and/or may be implemented by a separate server/device/system.

For example, the artificial intelligence model may include a plurality of neural network layers. Each layer has a plurality of weight values, and a layer operation is performed through calculation of a previous layer and operation of the plurality of weight values. Examples of neural networks comprise but are not limited to convolutional neural networks (CNN), deep neural networks (DNN), recurrent neural networks (RNN), restricted Boltzmann machine (RBM), deep belief networks (DBN), bidirectional recursive deep neural networks (BRDNN), generative adversarial networks (GAN) and deep Q networks.

The learning algorithm may include a method that uses a plurality of learning data to train a predetermined target device (for example, a robot) to make, allow, or control the target device to make a determination or prediction. Examples of the learning algorithm comprise, but are not limited to, supervised learning, unsupervised learning, semi-supervised learning, or reinforcement learning.

According to an embodiment, if the target serviced object is not identified from the voice of the user, a serviced object is provided to the user for selection, and/or the user of the voice input is determined as the target serviced object.

For example, a serviced object preset in the intelligent device may be provided to the user for selection. The target serviced object identified from a previously predetermined input may be provided to the user, and the user may confirm whether it is used as the target serviced object of the current voice input. The target serviced object determined based on the service custom may be provided to the user, and the user may confirm whether it is used as the target serviced object of the current voice input. However, the method for providing the serviced object to the user for selection is not limited to the above method. For example, the serviced object may be provided to the user for selection based on big data analysis. The method for providing the serviced object to the user for selection may be, for example, inquiring the user through voice output and receiving a response from the user. For example, if the target serviced object is identified as daughter from the voice input in the previously predetermined period, the intelligent device outputs a voice "whether to provide services for daughter" to the user for selection.

In addition, if the target serviced object is not identified from the voice of the user, the user of the voice input is determined as the target serviced object. For example, the user of the voice input may be determined based on voice information related to the voice input. According to an embodiment, if the current voice input does not comprise the serviced object, the user who issues the voice input may be determined as the target serviced object. If the current voice input and the voice input in the previously predetermined period do not comprise the target serviced object, the user who issues the voice input may be determined as the target serviced object. For example, dad says "please turn on the TV". Moreover, no user has provided any voice input to the intelligent device in the previously predetermined period. In this regard, dad is the target serviced object.

According to an embodiment, if it is determined that the service instruction is an instruction type comprising a serviced object, the step of determining the target serviced object for which the service instruction is intended is performed. For example, the service instruction identified from the voice input may comprise the serviced object. In this regard, the serviced object is identified from the service instruction, and the identified serviced object is used as the target serviced object. For example, the service instruction determined based on the voice input is "play a TV show that Xiaohua likes to watch". This instruction has the serviced object "Xiaohua". Thus Xiaohua is determined as the target serviced object.

According to an embodiment, an effect of providing services to the target serviced object for which the service instruction in the voice input of the user is intended may be achieved. For example, dad says to the intelligent speaker "play a song for Xiaohua". Then, the intelligent speaker identifies that Xiaohua in the instruction is the listening object and plays the types of songs that Xiaohua listened before or little girls like to listen based on the information related to Xiaohua.

Figure 2:
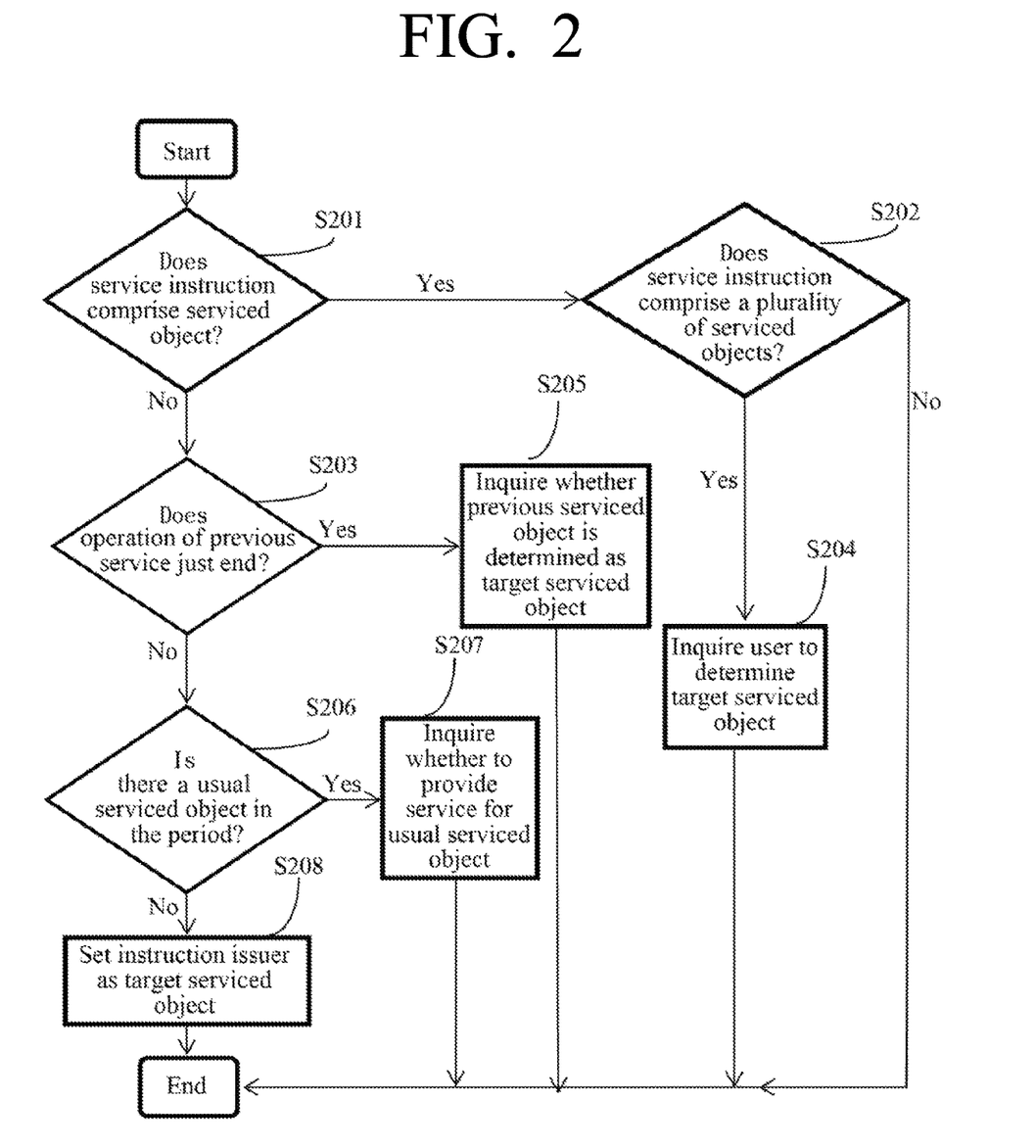
FIG. 2 is a flowchart illustrating an example method of determining a target serviced object for which a service instruction is intended according to various embodiments.

FIG. 2 is a flowchart illustrating an example method for determining a target serviced object for which a service instruction is intended according to various embodiments.

According to an embodiment, in operation S201, the method comprises determining whether the service instruction comprises a serviced object.

In operation S202, the method comprises determining whether the service instruction comprises a plurality of serviced objects.

If the service instruction comprises the plurality of serviced objects ("Yes" in operation S202), then in operation S204, a user is inquired to determine the target serviced object. If not, the serviced object comprised in the service instruction is determined as the target serviced object.

If the service instruction does not comprise a serviced object ("No" in operation S201), then in operation S203, it is determined that whether an operation of a previous service just ends.

If the operation of the previous service just ends ("Yes" in operation S203), then in operation S205, it is inquired whether a previous serviced object is determined as the target serviced object, otherwise ("No" in operation S203), in operation S206, it is determined whether there is a usual serviced object in the period.

If there is the usual serviced object in the period ("Yes" in operation S206), then in operation S207, it is inquired whether to provide a service for the usual serviced object, otherwise ("No" in operation S206), in operation S208, an instruction issuer is set as the target serviced object.

Referring back to FIG. 1, in operation S104, the method comprises determining a target execution element of the service instruction based on the target serviced object.

According to an example embodiment, the operation of determining the target execution element of the service instruction based on the target serviced object comprises: obtaining personalized configuration information of the target serviced object, and determining the target execution element for the target serviced object based on the personalized configuration information. According to an embodiment of the present disclosure, the target execution element comprises at least one of an executing body, an execution parameter, and a control parameter. For example, the executing body refers to an electronic apparatus that performs an actual operation and actually provides a service to the user (for example, intelligent speaker itself, air conditioner, TV, oven, microwave oven, tablet, etc.). According to an embodiment, the executing body may be one or more electronic apparatuses. That is, the service instruction may control a plurality of electronic apparatuses to operate at the same time. For example, if the service instruction is "prepare to sleep", the executing body may comprise TV, air conditioner, curtain, etc., but is not limited hereto. According to an embodiment, the execution parameter in the target execution element may be an attribute of the electronic apparatus, for example, but is not limited to, the temperature, wind power, and wind direction of the air conditioner. According to an embodiment, the control parameter in the target execution element may be a value of the execution parameter, for example, but is not limited to, the temperature of the air conditioner is 26 degrees and the wind power is zero.

As described above, the intelligent speaker itself may be used as the executing body in the target execution element. For example, the service instruction is "play a song for Xiaohua". In this regard, the intelligent speaker is the executing body, and the execution element is, for example, content parameter of the song that Xiaohua likes. The intelligent speaker plays a children's song based on Xiaohua's preference with the volume and audio effect that Xiaohua is used to.

According to an embodiment, the personalized configuration information of the target serviced object may be established based on the historical service data of the target serviced object. For example, the intelligent device records historical service data of each user, classifies the historical service data, and performs a statistical operation on the same or similar historical service data to establish the personalized configuration information of the corresponding user. For example, after getting off work, mom usually controls the intelligent device to turn on TV to play CCTV news. Based on the above habit of mom, the intelligent device may set the personalized configuration information of mom after getting off work as turning on TV to play CCTV news. However, the method for establishing the personalized configuration information of the target serviced object based on the historical service data of the target serviced object is not limited hereto. For example, the historical service data and the personalized configuration information corresponding to the historical service data of the user may be input into a neural network model as input data. The model is then trained, and the trained neural network model is used to obtain the personalized configuration information of the target serviced object based on the historical service data of the target serviced object.

In addition, the personalized configuration information of the serviced object may be updated based on changes in the historical service data. For example, when the progress of a resource corresponding to the serviced object changes in case that the progress of the resource needs attention, then the latest progress of the resource is updated in the personalized configuration information of the serviced object; otherwise, the personalized configuration information of the serviced object remains unchanged. For example, dad's service instruction is "play Langyabang". It is determined that the serviced object is dad, and the service instruction is "play Langyabang". In this regard, after the playback is over, the playback progress should be updated in dad's preference data, so that the viewing progress is obtained upon the next playback. After a new serviced object is added, the newly added serviced object and its corresponding personalized configuration information may be added to the intelligent device. In addition, in the case that there is an explicit service instruction in the instruction and no serviced object is specified, if the preference of a possible serviced object can be matched, the content is updated in possible preference data of the serviced object based on the type of the playback resource and the usual serviced object. For example, the service instruction is "play Peppa Pig". There is no specified serviced object here. And Xiaohua is a usual serviced object. It is inferred that Peppa Pig fits the viewing preference of little girls, so Peppa Pig is updated in Xiaohua's preference types data.

In addition, according to an embodiment, if a plurality of target serviced objects are determined, the intelligent device may search for a common preference of the plurality of target serviced objects, and determines the target execution element based on the common preference, or selects one of the plurality of target serviced objects as a final target serviced object to determine the target execution element, based on user feedback. The common preference of the plurality of target serviced objects may be obtained based on the personalized configuration information of each target serviced object. For example, the service instruction is "play a TV series for adults". The adults in the family are dad and mom, so it may be determined that the target execution element is a TV series that both dad and mom like. According to an embodiment, the user is allowed to select one of the plurality of target serviced objects as the final target serviced object. For example, the user may be provided with a voice output for selecting one of the plurality of target serviced objects, and the target execution element may be determined based on a response of the user. For example, the user instruction is "play an animation for Xiaohua and Xiaohu". The instruction contains two serviced objects, Xiaohua and Xiaohu, a girl and a boy. The intelligent device firstly searches whether they have a common favorite animation, and plays the animation that they share a common interest. Alternatively, the intelligent device inquires to determine whose preference prevails (for example, outputting the voice output "May I ask whether Xiaohua or Xiaohu's preference prevails"), and determines the target execution element of the intended target serviced object based on the response of the user. According to an embodiment of the present disclosure, if the plurality of target serviced objects have no common preference, the intelligent device may inquire the user to select one of the plurality of target serviced objects as the target serviced object. If there are a plurality of target serviced objects, the user may be directly inquired to select one of the plurality of target serviced objects as the target serviced object. Although the method for determining the target execution element in case that a plurality of target serviced objects are determined is discussed above, the method for determining the target execution element for a plurality of target serviced objects of the present disclosure is not limited to the above method, and any method that can achieve the above function may be used in the present disclosure. For example, if the target serviced objects are young, their preferences may be substantially the same. In this regard, the preference data for one of the target serviced objects may be selected, or the selection may be made based on the record of big data.

According to an embodiment, if there are a plurality of intelligent devices, the target execution element comprises an execution element for each of the plurality of intelligent devices. That is, the user may send the voice input to the plurality of intelligent devices. Each of the plurality of intelligent devices respectively determines its own target execution element, and provides an action corresponding to the service instruction in the voice input of the user. Alternatively, if there are a plurality of intelligent devices, the intelligent device closest to the target serviced object may provide the action corresponding to the service instruction in the voice input of the user.

In operation S105 (referring to FIG. 1), the method comprises controlling the intelligent device to perform an action corresponding to the service instruction based on the target execution element. That is, preference data of the target serviced object is selected for services according to the instruction requirement based on the target serviced object determined in operation S103. The action corresponding to the service instruction may be a single action (for example, playing a program) or a combined action (for example, turning on the air conditioner, turning off the TV, and turning off the light, etc.). The single action may refer, for example, to playing a program, for example, playing a song or playing a specific program with a specific progress. For example, the user instruction is "play the TV series X". In this instruction, the user himself is the actual serviced object. In this regard, it is necessary to find the user's viewing progress related to the TV series X and play the TV series X with the found viewing progress. The combined action is a series of actions corresponding to some instruction content (for example, getting up, going to bed, etc.). For example, the service instruction is "Xiaohua is going to sleep". In this instruction, "going to sleep" is the service instruction, and the serviced object is identified as Xiaohua. For this instruction, data of home electronic apparatuses which is set for "Xiaohua is going to sleep" are selected, such as light, air conditioner, TV, curtain, and audio equipment. The target execution element of each device is obtained through personalized analysis for Xiaohua, thereby controlling these electronic devices to perform actions such as light adjustment, temperature adjustment, video on or off, curtain opening or closing, and audio playback (for example, playing Xiaohua's favorite bedtime program types, etc.). According to an embodiment, the intelligent device sends control information for controlling each electronic apparatus to the corresponding electronic apparatus based on the determined target execution elements.

Figure 3:
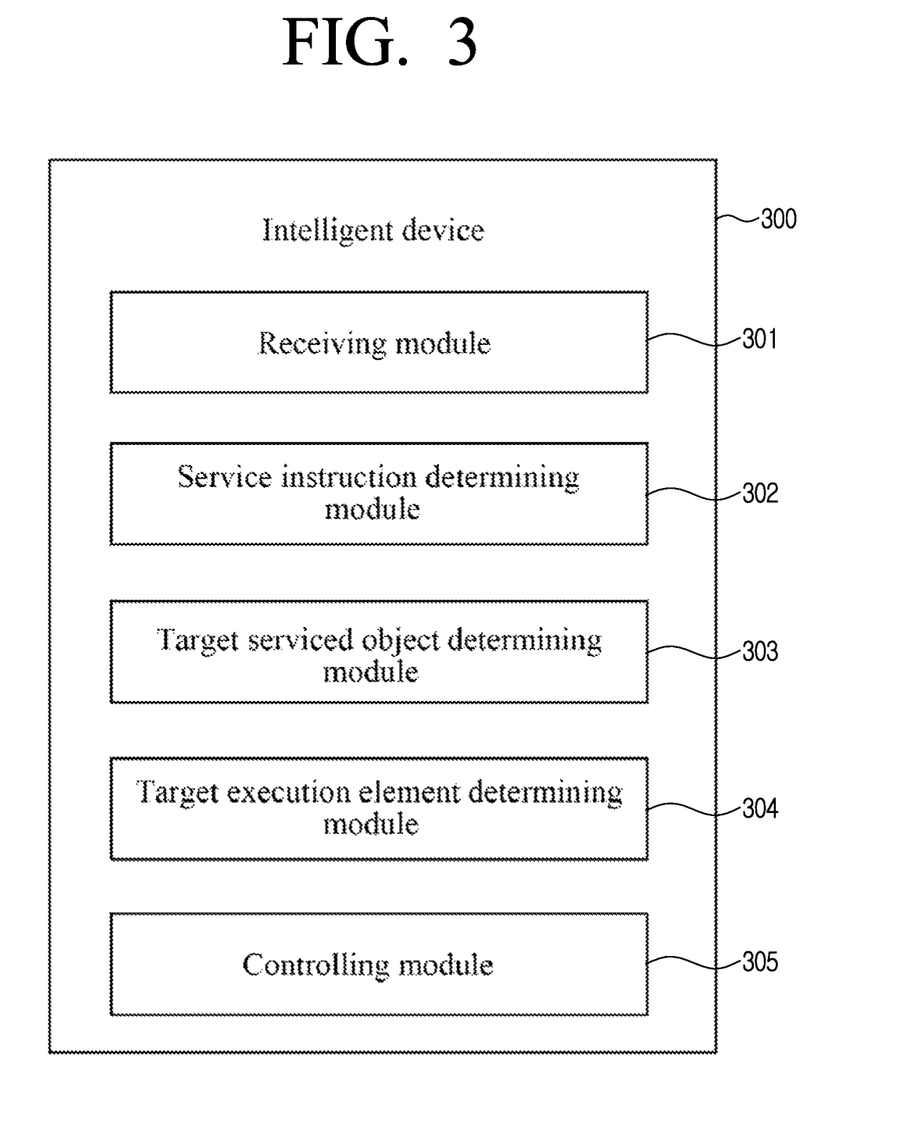
FIG. 3 is a block diagram illustrating an example intelligent device according to various embodiments.

FIG. 3 is a block diagram illustrating a configuration of an example intelligent device 300 according to various embodiments.

With reference to FIG. 3, the intelligent device 300 according to an embodiment may include: a receiving module (e.g., including receiving circuitry) 301, a service instruction determining module (e.g., including processing circuitry and/or executable program elements) 302, a target serviced object determining module (e.g., including processing circuitry and/or executable program elements) 303, a target execution element determining module (e.g., including processing circuitry and/or executable program elements) 304 and a controlling module (e.g., including processing circuitry and/or executable program elements) 305.

For example, the receiving module 301 may include various receiving circuitry and is configured to receive a voice input of a user. The service instruction determining module 302 may include various processing circuitry and/or executable program elements and is configured to determine a service instruction based on the voice input. The target serviced object determining module 303 may include various processing circuitry and/or executable program elements and is configured to determine a target serviced object for which the service instruction is intended. The target execution element determining module 304 may include various processing circuitry and/or executable program elements and is configured to determine a target execution element of the service instruction based on the target serviced object. The controlling module 305 may include various processing circuitry and/or executable program elements and is configured to control the intelligent device 300 to perform an action corresponding to the service instruction based on the target execution element.

As an example, the service instruction determining module 302 may determine the service instruction in the voice input based on voice recognition technology, or may determine the service instruction by converting the voice input into text information and identifying a keyword in the text information. However, the method for determining the service instruction in the voice input is not limited hereto.

In addition, the method for determining the target serviced object for which the service instruction is intended may consider many situations. The processing of determining the target serviced object for which the service instruction is intended will be described below.

As an example, the target serviced object determining module 303 may be configured to identify the target serviced object from a voice of the user. As another example, the target serviced object determining module 303 is further configured to identify the target serviced object from the voice input, or obtain the target serviced object by analyzing a voice input in a previously predetermined period.

The target serviced object determining module 303 according to an embodiment obtains the target serviced object from the voice input or the voice input in the previously predetermined period in the same method. The method for identifying the target serviced object from the voice input has been described with reference to FIG. 1. Therefore, detailed description thereof may not be repeated here.

In addition, the target serviced object determining module 303 may be further configured to determine the target serviced object based on a tag vocabulary in the voice of the user, which is related to the target serviced object. For example, the tag vocabulary in the intelligent device 300 may be user data information previously recorded by the intelligent device 300, and the user data information are identity tags for distinguishing different objects. The user's nickname or social relationship vocabulary, etc. may be used as the identity tag related to the user in the intelligent device 300. If the nickname or social relationship vocabulary related to the target serviced object is identified, the user corresponding to the nickname or social relationship vocabulary may be determined as the target serviced object.

As an example, the target serviced object determining module 303 may be configured to determine the target serviced object based on a service custom, in response to the target serviced object being not identified from the voice of the user. The service custom is obtained based on a historical voice input and its corresponding historical service data. The historical service data comprises a service instruction, a serviced object, a service environment (comprising time environment and/or geographic environment, for example), etc. The service custom refers to a service custom obtained by the intelligent device 300 based on the historical voice input and the historical service data provided for the historical voice input. For example, based on a historical instruction record at the same time period in many days, data of a daily-same-period instruction custom of the intelligent speaker is established. For example, the service custom is obtained through a training of an artificial intelligence model with the historical voice input and the historical service data based on an artificial intelligence algorithm, such that the target serviced object of the service instruction in the current environment can be predicted. However, the method for obtaining the service custom of the present disclosure is not limited to the above method, and any method for obtaining the service custom of the intelligent device 300 may be used in the present disclosure.

As an example, the target serviced object determining module 303 according to an embodiment may be configured to: provide a serviced object to the user for selection, and/or determine the user of the voice input as the target serviced object, in response to the target serviced object being not identified from the voice of the user. For example, if the target serviced object is not identified from the voice of the user, the intelligent device 300 inquires the user whether the serviced object analyzed from the voice input in the previously predetermined period is the target serviced object, or whether the serviced object determined based on the custom is the target serviced object, and receives a response of the user.

As another example, the target serviced object determining module 303 may be configured to: if it is determined that the service instruction is an instruction type comprising a serviced object, the step of determining the target serviced object for which the service instruction is intended is performed.

In addition, the target execution element determining module 304 according to an embodiment may be configured to: obtain personalized configuration information of the target serviced object, and determine the target execution element for the target serviced object based on the personalized configuration information. For example, the target execution element comprises at least one of the following: an executing body, an execution parameter, and a control parameter. The personalized configuration information of the target serviced object may be established based on the historical service data of the target serviced object.

In an embodiment, the target execution element may refer, for example, to content of a service to be provided to the target serviced object, and specifically comprises a function realized by the electronic apparatus in control of the intelligent device 300.

In addition, the target execution element determining module 304 may be configured to: in response to a plurality of target serviced objects being determined, search for a common preference of the plurality of target serviced objects, and determining the target execution element based on the common preference, or select one of the plurality of target serviced objects as a final target serviced object to determine the target execution element, based on a user's feedback. The present disclosure addresses the problem of providing services for a plurality of target objects in the above method, thereby improving user experience.

As another example, if there are a plurality of intelligent devices, the target execution element comprises an execution element for each of the plurality of intelligent devices. For example, if there are a plurality of intelligent speakers at user's home, each intelligent speaker comprises its own corresponding target execution element based on the voice input of the user, to control its related electronic apparatus.

According to an embodiment, a non-transitory computer-readable storage medium storing a computer program is provided, wherein the computer program, when executed by a processor, causes the processor to perform the method for controlling an intelligent device as described above.

According to an embodiment, an electronic device is provided. The electronic device comprises: a processor; and a memory, storing a computer program, wherein the computer program, when executed by the processor, causes the electronic device to perform the method for controlling an intelligent device as described above.

In the method for controlling an intelligent device according to an embodiment, if the intelligent device obtains an ambiguous instruction, it may analyze the target serviced object for which the instruction is intended, and provide a service for the target serviced object. The method of the present disclosure expands the application scope of the intelligent device and provides convenience for the user's life.

In the method for controlling an intelligent device according to an embodiment, the target serviced object may be determined based on the voice of the user, which realizes an effect that the user controls the intelligent device for others, and provides convenience for the user.

In the method for controlling an intelligent device according to an embodiment, the target serviced object may be determined based on the identified tag vocabulary, thereby improving the robustness of obtaining the target serviced object.

In the method for controlling an intelligent device according to an embodiment, the target serviced object may be determined based on the service custom, thereby improving the accuracy of identifying the target serviced object.

In the method for controlling an intelligent device according to an embodiment, the final target serviced object may be determined by inquiring the user, which may accurately provide services to the target serviced object and improve user experience.

In the method for controlling an intelligent device according to an embodiment, the target execution element for the target serviced object may be determined based on the personalized configuration information of the target serviced object, which may better conform to the user's usage habit and improve the service effect of the intelligent device.

In the method for controlling an intelligent device according to an embodiment, the final target serviced object may be determined based on common preference of a plurality of target serviced objects or the user feedback, which may solve the problem of a plurality of serviced objects and improve the practicability of the intelligent device.

In the method for controlling an intelligent device according to an embodiment, a plurality of intelligent devices may be controlled to provide the service to the user, which improves user experience.

As used herein, each of phrases such as "A or B", "at least one of A and B", "at least one of A or B", "A, B or C", "at least one of A, B, and C" and "at least one of A, B, or C" may comprise all possible combinations of items listed together in a corresponding phrase in the phrases. As used herein, terms such as "first" and "second" may be used to distinguish a corresponding component from another component, but are not intended to limit the component in other aspects (e.g., importance or order). Without departing from the spirit and scope of the present disclosure, if an element (for example, a first element) is referred to as "coupled with another element (for example, a second element)", "coupled to" another element (for example, a second element), "connected with another element (for example, a second element)", or "connected to" another element (for example, a second element) with or without the term "operably" or "communicatively", it indicates that the element may be coupled with the another element directly (for example, wired), wirelessly, or via a third element.

As used herein, the term "module" may comprise a unit implemented in hardware, software, firmware, or a combination thereof, and may be used interchangeably with other terms (for example, "logic", "logic block", "component" or "circuit"). The module may be a single integrated component configured to perform one or more functions or the smallest unit or part of the smallest unit of the single integrated component. For example, according to an embodiment of the present disclosure, the module may be implemented in the form of an application specific integrated circuit (ASIC).

The various embodiments set forth herein may be implemented as software comprising one or more instructions stored in a storage medium that can be read by a machine (e.g., a mobile apparatus or an electronic device). For example, under the control of a processor, the processor of the machine may call at least one of the one or more instructions stored in the storage medium with or without using one or more other components and run the at least one instruction. This enables the machine to perform at least one function based on the called at least one instruction. The one or more instructions may comprise code generated by a compiler or code executable by an interpreter. The machine readable storage medium may be provided in the form of a non-transitory storage medium. The "non-transitory" storage medium is a tangible apparatus and may not comprise signals (for example, electromagnetic waves), but the term does not distinguish between data being stored semi-permanently in the storage medium and data being temporarily stored in the storage medium.

According to an embodiment, the method according to various embodiments of the present disclosure may be comprised and provided in a computer program product. The computer program product may be used as a product for transactions between sellers and buyers. The computer program product may be published in the form of the machine readable storage medium, or the computer program product may be published online (for example, download or upload) via an application store (for example, Play Store™), or the computer program product may be directly published (for example, download or upload) between two user apparatuses (for example, smart phones). If published online, at least a part of the computer program product may be temporarily generated, or temporarily stored in the machine readable storage medium (such as a manufacturer's server, an application store's server or a forwarding server's memory).

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. A method for controlling an intelligent device, the method comprising
receiving a voice input;
determining a service instruction based on the received voice input;
determining whether the service instruction is to consider a target serviced object based on a name of the service instruction and/or a type of the service instruction;
based on the name of the service instruction being a predetermined name and/or
based on the type of the service instruction being a predetermined type, determining the service instruction is to consider the target serviced object;
based on determining that the service instruction is to consider the target serviced object, determining the target serviced object for which the service instruction is intended based on the received voice input and a predetermined number of previous dialogues before the received voice input;
determining a target execution element of the service instruction based on the target serviced object; and
controlling the intelligent device to perform an action corresponding to the service instruction based on the target execution element,
wherein determining the target serviced object comprises determining the target serviced object based on a user of the received voice input, a content of the service instruction, context information of the service instruction and a tag vocabulary in the received voice input related to the target serviced object,
wherein the tag vocabulary includes a nickname or a social relationship vocabulary,
wherein the tag vocabulary is user data information stored automatically in the intelligent device,
wherein the user data information is identity tags for distinguishing different objects,
wherein the target serviced object is determined based on a service custom in response to the target serviced object not being identified from the received voice input,
wherein the service custom is obtained based on a historical voice input and its corresponding historical service data, and
wherein the service custom is obtained through training with the historical voice input and the historical service data based on an artificial intelligence algorithm,
wherein the method further comprises:
obtaining personalized configuration information of the target serviced object, wherein the personalized configuration information of the target serviced object is established based on the historical service data of the target serviced object,
in response to a plurality of target serviced objects being determined, searching for a common preference of the plurality of target serviced objects, wherein the common preference of the plurality of target serviced objects is obtained based on the personalized configuration information of each target serviced object, and
determining the target execution element based on the common preference, wherein the target execution element comprises at least one of an executing body, an execution parameter and a control parameter.

2. The method according to claim 1, wherein in response to the target serviced object not being identified from the received voice input, a serviced object is provided for selection, and/or the user of the received voice input is determined as the target serviced object.

3. The method according to claim 1, wherein based on determining that the service instruction is an instruction type comprising a serviced object, the determining the target serviced object is performed.

4. The method according to claim 1, wherein based on there being a plurality of intelligent devices, the target execution element comprises an execution element for each of the plurality of intelligent devices.

5. The method according to claim 1, wherein the controlling the intelligent device comprises:
performing the action including at least one of light adjustment, temperature adjustment, video on or off, and curtain opening or closing based on the target execution element.

6. The method according to claim 1, wherein the executing body includes a plurality of electronic apparatuses, and
wherein the service instruction includes an instruction for controlling the plurality of electronic apparatuses.

7. The method according to claim 6, wherein, if the service instruction is "prepare to sleep", the executing body includes TV and air conditioner.

8. An intelligent device, comprising
a receiving module, comprising circuitry, configured to receive a voice input;
a service instruction determining module, comprising circuitry, configured to:
  determine a service instruction based on the voice input;
  determine whether the service instruction is to consider a target serviced object based on a name of the service instruction and/or a type of the service instruction;
  based on the name of the service instruction being a predetermined name and/or based on the type of the service instruction being a predetermined type, determine that the service instruction is to consider the target serviced object;
a target serviced object determining module, comprising circuitry, configured to based on determining that the service instruction is to consider the target serviced object, determine the target serviced object for which the service instruction is intended based on the received voice input and a predetermined number of previous dialogues before the received voice input;
a target execution element determining module, comprising circuitry, configured to determine a target execution element of the service instruction based on the target serviced object; and
a controlling module, comprising circuitry, configured to control the intelligent device to perform an action corresponding to the service instruction based on the target execution element,
wherein the target serviced object determining module is configured to determine the target serviced object based on a user of the received voice input, a content of the service instruction, context information of the service instruction and a tag vocabulary in the received voice input related to the target serviced object,
wherein the tag vocabulary includes a nickname or a social relationship vocabulary,
wherein the tag vocabulary is user data information stored automatically in the intelligent device,
wherein the user data information is identity tags for distinguishing different objects,
wherein the target serviced object is determined based on a service custom in response to the target serviced object not being identified from the received voice input,
wherein the service custom is obtained based on a historical voice input and its corresponding historical service data, and
wherein the service custom is obtained through training with the historical voice input and the historical service data based on an artificial intelligence algorithm,
wherein the target serviced object determining module is further configured to:
  obtain personalized configuration information of the target serviced object, wherein the personalized configuration information of the target serviced object is established based on the historical service data of the target serviced object,
  in response to a plurality of target serviced objects being determined, search for a common preference of the plurality of target serviced objects, wherein the common preference of the plurality of target serviced objects is obtained based on the personalized configuration information of each target serviced object, and
  determine the target execution element based on the common preference, wherein the target execution element comprises at least one of an executing body, an execution parameter and a control parameter.

* * * * *